atent [11] 3,579,140

| [72] | Inventors | James M. Anderson<br>New Milford;<br>Marvin J. Fenton, Stamford, Conn. |
|---|---|---|
| [21] | Appl. No. | 688,204 |
| [22] | Filed | Dec. 5, 1967 |
| [45] | Patented | May 18, 1971 |
| [73] | Assignee | The Perkin-Elmer Corporation<br>Norwalk, Conn. |

[54] LASER
3 Claims, 4 Drawing Figs.

[52] U.S. Cl. .................................................. 331/94.5,
356/172, 250/209
[51] Int. Cl. ...................................................... G01b 11/26,
H01s 3/00
[50] Field of Search ........................................... 331/94.5;
356/172; 250/209, 210, 201, (Align-Digest)

[56] References Cited
UNITED STATES PATENTS

| 3,229,224 | 1/1966 | Waly et al. ..................... | 331/94.5 |
| 3,252,110 | 5/1966 | Gustafson et al. ............. | 331/94.5 |
| 3,359,812 | 12/1967 | Everitt........................... | 331/94.5X |
| 3,357,268 | 12/1967 | Richter.......................... | 331/94.5X |
| 3,400,596 | 9/1968 | Laich ............................ | 331/94.5X |
| 3,404,352 | 10/1968 | Bowness....................... | 331/94.5 |
| 3,428,915 | 2/1969 | Leone et al. ................... | 331/94.5 |
| 3,229,099 | 1/1966 | Schwinghamer et al. ...... | 356/172X |
| 3,218,915 | 11/1965 | Ramsay......................... | 331/94.5 |
| 3,316,800 | 5/1967 | Kibler............................ | 250/201 |

*Primary Examiner*—Ronald L. Wibert
*Assistant Examiner*—Paul K. Godwin
*Attorney*—Edward R. Hyde, Jr.

ABSTRACT: A continuous wave laser in which the end mirrors are automatically maintained in alignment. A four-quadrant detector is centered along the path of the emerging light beam. Misalignment of the end mirrors causes an axial shift in the direction of the light beam and produces output signals from the four-quadrant detector from which can be determined the direction and amount of shift. These signals are used to servocontrol the position of one of the mirrors so as to bring it back into alignment with the other mirror.

Patented May 18, 1971
3,579,140
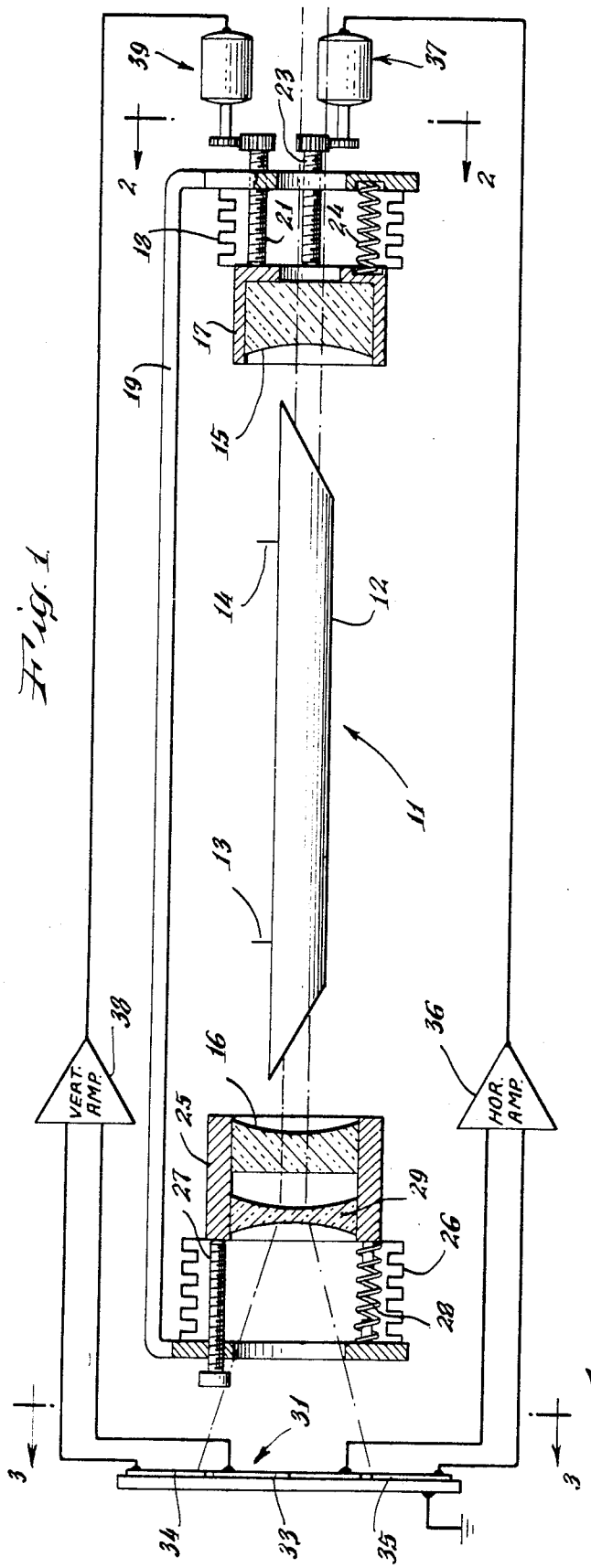
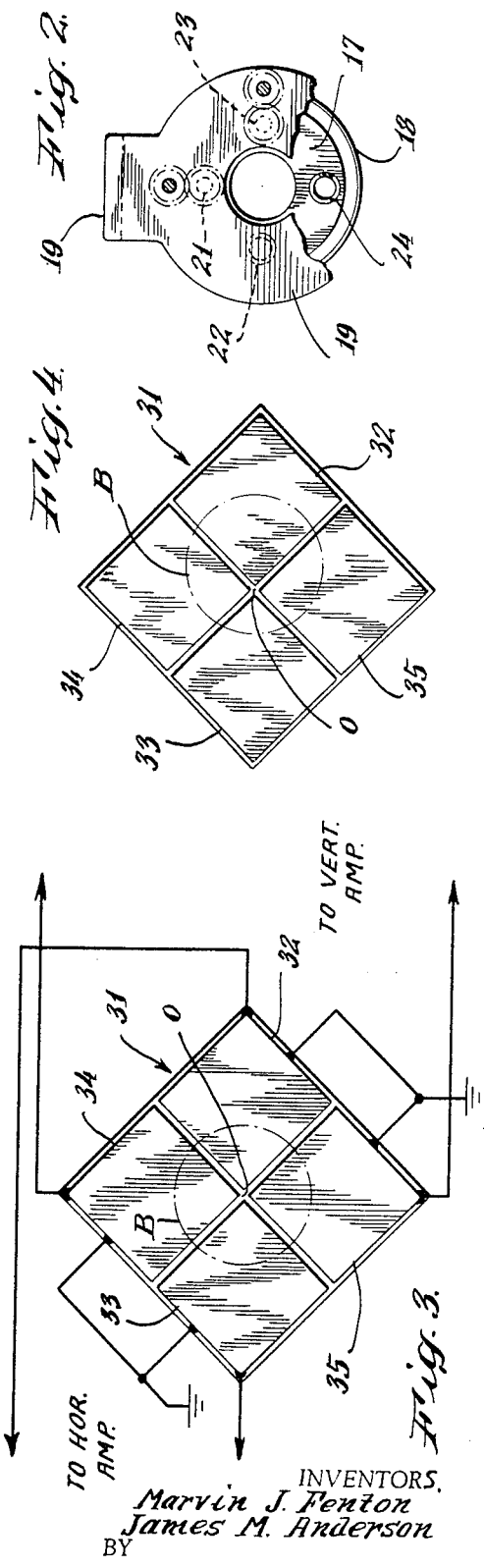
INVENTORS.
Marvin J. Fenton
James M. Anderson
BY
Irving M. Kriegsman
ATTORNEY.

LASER

This invention relates to lasers. More particularly, this invention relates to a new and improved technique for maintaining the end mirrors of a continuous wave laser in proper alignment while the laser is in operation.

The recent development of the laser has made possible the generation and amplification of coherent electromagnetic wave energy in the optical frequency range. Basically, a laser is a device comprising an optically resonant cavity, an active material which is located in the optically resonant cavity and a mechanism for exciting the active material to produce gain. The optically resonant cavity is generally in the form of a pair of spaced apart mirrors at least one of which is partly transmissive to permit the extraction of light. The light emerges as a highly directional beam. The active material may be either a solid, a liquid or a gas. Several different types of excitation mechanisms are now known and used such as for example, an RF field, a direct current or a flash lamp.

The following is a list of some of the pertinent published material:

1. A book entitled "Lasers" authored by Bela A. Lengyel and published by John Wiley and Sons, U.S.A., 1962;
2. An article appearing in the Scientific American, June, 1961, Volume 204, No. 6, pages 52 through 62;
3. U.S. Pat. No. 2,929,922;
4. U.S. Pat. No. 3,172,057;
5. U.S. Pat. No. 3,252,110.

It is now well known that in order to obtain the maximum output from a laser the two end mirrors forming the resonant cavity must be properly and precisely aligned and then be maintained in alignment while the laser is in operation. Frequently, thermal, mechanical or other forces will cause the mirrors to become misaligned resulting in a loss in output power.

One reported technique for automatically maintaining the end mirrors in alignment involves sensing changes in the intensity of the output beam caused by misalignment and converting these changes into signals which are used to servodrive one of the mirrors back into alignment with the other mirror. Although this technique is generally satisfactory, it does have limitations. One of these limitations is that the technique will only sense misalignment if the misalignment produces a change in the intensity of the output beam. For some types of lasers, the gain curve is such that extremely small changes in mirror alignment will not result in a detectable change in the intensity of the output beam. Thus, the need has arisen for a new and improved technique for detecting misalignment of the end mirrors and producing error signals in accordance therewith which can be used to automatically realign the mirrors.

Accordingly, it is an object of this invention to provide a new and improved laser.

It is another object of this invention to provide a new and improved technique for detecting misalignment of the end mirrors in a continuous wave laser.

It is still another object of this invention to provide a laser in which the end mirrors are automatically maintained in alignment.

It is yet still another object of this invention to provide an improved argon laser.

The above and other objects are achieved according to this invention in which changes in the direction (that is, the axial position) of the emerging light beam rather than changes in the intensity of the beam are used to determine alignment. Changes in the direction of the light beam are converted into signals which are used to servocontrol one of the mirrors relative to the other mirror. The invention is based on the recognition that misalignment of the end mirrors results in an axial shift in the emerging light beam which is monotone increasing with misalignment.

Briefly, the invention comprises a four-quadrant light sensitive detector centered along the optical axis of the emerging light beam for detecting changes in the axial direction of the light beam about two mutually perpendicular axes caused by misalignment of the mirrors and means coupled to the four-quadrant detector and one of the mirrors for realigning that mirror relative to the other mirror. Very small changes in angular alignment will result in relatively large changes in the axial position of the emerging light beam. Thus, the system is highly sensitive to misalignment.

Other features and attendant advantages of the invention will become apparent on reading the following detailed description of an embodiment when considered in connection with the accompanying drawings in which like reference numerals represent like parts and wherein:

FIG. 1 is a view partly in schematic and partly in block diagram form of an embodiment of the invention;

FIG. 2 is an end view of the apparatus of FIG. 1 taken along axis 2–2.

FIG. 3 is a view of the detector and connected wiring shown in FIG. 1 taken along axis 3–3 illustrating how the light beam impinges thereon when the mirrors are aligned; and FIG. 4 is a view of the detector shown in FIG. 3 illustrating how the light beam impinges thereon when the mirrors are misaligned.

It is to be understood that the invention is applicable to any continuous wave laser. However, for purposes of illustration the invention is described with reference to a DC excited gas laser.

Referring now to the drawings and in particular to FIG. 1 there is shown an embodiment of an apparatus constructed according to this invention. The apparatus includes a laser 11 for producing a coherent beam of light. Laser 11 includes an elongated tube 12 for holding a quantity of active gaseous material. A pair of internally extending electrodes 13 and 14 are mounted on the tube 12 and connected to a DC power source (not shown) for exciting the active gaseous material. The active gaseous material may be, for example, argon. The tube 12 is located inside a resonant cavity which comprises a pair of mirrors 15 and 16. Mirror 15 is partially transmissive to permit the extraction of some of the light. Mirror 15 is mounted on a support ring 17 which is connected by a bellows 18 to a support frame 19. Means are provided for controlling the horizontal and vertical positioning of mirror 15 so that it can be properly aligned relative to mirror 16. These means include a screw 21 and a spring 22 mounted along a vertical axis for adjusting the mirror 15 vertically and a screw 23 and spring 24 mounted along a horizontal axis for adjusting the frame 15 horizontally. The location of the screws 21 and 23 and springs 22 and 24 can be seen more clearly in FIG. 2. Mirror 16 is also partly transmissive to permit the extraction of some light from the laser 11. Mirror 16 is mounted on a support ring 25 which is connected by bellows 26 to the support FRAME 19. Mirror 16 is also provided with means similar to that used with mirror 15 for adjusting the mirror horizontally and vertically. These means include a screw 27 and spring 28 for adjusting the mirror 16 vertically and a screw and pivot spring (not shown) for adjusting the mirror horizontally. A diverging lens 29 is positioned along the optical axis and is mounted on the support 25 for expanding the size of the emerging beam of light.

The apparatus further includes a four-quadrant detector 31 precisely aligned along the optical axis of the laser 11. The optical axis of the laser 11 is of course the optical axis of the light beam when the mirrors are normally aligned. The four-quadrant detector which is shown in more detail in FIGS. 3 and 4 comprise four separate light sensitive detectors 32 through 35 symmetrically disposed about a center point 0. Center point 0 is positioned along the optical axis of the laser 11 along the path of the light beam. The four-quadrant detector 31 is oriented so that two of the detectors 32 and 33 are symmetrically disposed about the vertical axis and the other two detectors 34 and 35 are symmetrically disposed about the horizontal axis. Thus, as can be seen in FIG. 3, when the mirrors are precisely aligned equal amounts of light from the beam B will impinge on each of the four detectors. Any misalignment will cause a corresponding axial shift in the light beam B. For example, if the mirrors become misaligned horizontally, the light beam B is shifted so as to strike the four-quadrant detector 31 as shown in FIG. 4. The outputs from detectors 32 and 33 are fed into a differential amplifier 36 which produces an output signal whose polarity and magnitude correspond to the direction (i.e. left or right) and amount of shift of the light beam. This output is fed into a motor 37 which is coupled to the spring biased screw 23 for controlling the horizontal position of the mirror 15. The output from detectors 34 and 35 is similarly fed into a differential amplifier 38 which is connected to a motor 39 which in turn is coupled to the spring biased screw 21 for controlling the vertical position of the mirror 15.

Thus, the end mirrors 15 and 16 of the laser are automatically maintained in precise alignment.

It should be noted that the above-described embodiment is only an example of the invention and that numerous modifications and alterations may be made without departing from the spirit and the scope of the invention as set forth in the appended claims.

For example, the servosystem could be connected to mirror 16 so that this mirror could be controlled rather than mirror 15. Magnetostrictive elements or other equivalent means responsive to electrical signals from the four-quadrant detector could be used in place of the mechanical drive system for controlling the position of the mirrors. A beam splitter could be positioned along the path of the light beam emerging from mirror 15 to deflect part of the beam into the servosystem rather than having light beams emerging from each end of the laser. The four-quadrant detector need not be in the form of four diamond-shaped elements but could be, for example, square-shaped elements or other shapes in which the four elements could be symmetrically disposed about a center point,

We claim:
1. Apparatus of the type described comprising:
a laser for producing a beam of coherent light, the laser including a resonant cavity in the form of a pair of partially transmissive end mirrors normally aligned along the optical axis of the laser,
a four-quadrant light sensitive detector outside one end of the resonant cavity with its center substantially in alignment with the optical path of the laser, sensing the intensity of the light beam about two orthogonal axes and producing electrical output signals from which can be determined the size and direction of change in the direction of the light beam caused by misalignment of the mirrors,
electronic means for converting the output signals from the four-quadrant detector into two electrical signals, the polarity and amplitude of one signal corresponding to the direction in magnitude of change in the light beam about one axis and the other in the polarity and amplitude of the other signal corresponding to the directing and magnitude of change of the light beam about the other axis, and
means for changing the position of one of the mirrors about two orthogonal axes in response to the two electrical signals so as to restore the beam to its original direction and thereby realign the mirrors.
2. The apparatus of claim 1 including a diverging lens in axial alignment between the center of said detector and the end mirror defining the adjacent end of the resonant cavity.
3. The apparatus of claim 1 in which said electronic means comprise one differential amplifier connected to receive the outputs from two of the detectors and another connected to receive the outputs of the other two detectors.